US009491625B2

(12) United States Patent
Jung et al.

(10) Patent No.: US 9,491,625 B2
(45) Date of Patent: Nov. 8, 2016

(54) ACCESS POINT APPARATUS FOR CONFIGURING MULTIPLE SECURITY TUNNEL, AND SYSTEM HAVING THE SAME AND METHOD THEREOF

(71) Applicant: ELECTRONICS AND TELECOMMUNICATIONS RESEARCH INSTITUTE, Daejeon (KR)

(72) Inventors: Woo Sug Jung, Daejeon (KR); Eun Joo Kim, Daejeon (KR); Jong Dae Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/623,008

(22) Filed: Feb. 16, 2015

(65) Prior Publication Data
US 2015/0288658 A1    Oct. 8, 2015

(30) Foreign Application Priority Data

Apr. 7, 2014    (KR) ........................ 10-2014-0041005

(51) Int. Cl.
| | | |
|---|---|---|
| *G06F 17/00* | (2006.01) | |
| *H04W 12/08* | (2009.01) | |
| *H04W 12/02* | (2009.01) | |
| *H04L 29/06* | (2006.01) | |
| *H04W 84/12* | (2009.01) | |

(52) U.S. Cl.
CPC ............. *H04W 12/08* (2013.01); *H04W 12/02* (2013.01); *H04L 63/0272* (2013.01); *H04L 63/20* (2013.01); *H04W 84/12* (2013.01)

(58) Field of Classification Search
CPC ... H04L 63/20; H04L 63/0272; H04L 63/08; H04L 63/1441; H04L 2463/141; H04L 63/0263; H04L 63/0435; H04L 63/0442; H04L 63/061; H04L 63/0823; H04L 63/102; H04L 63/1408; H04L 63/1425; H04L 63/18; H04W 12/08; H04W 12/02; H04W 84/12
USPC .......................................................... 726/1
See application file for complete search history.

(56) References Cited

U.S. PATENT DOCUMENTS

| | | | |
|---|---|---|---|
| 8,996,716 B2 * | 3/2015 | Tinnakornsrisuphap | ........................ H04W 92/02 370/355 |
| 2011/0002302 A1 * | 1/2011 | Ding | ................... H04W 76/041 370/331 |
| 2012/0327907 A1 | 12/2012 | Ding et al. | |
| 2013/0029639 A1 | 1/2013 | Lee et al. | |

FOREIGN PATENT DOCUMENTS

| | | |
|---|---|---|
| KR | 10-2006-0055085 A | 5/2006 |
| KR | 10-2011-0039386 A | 4/2011 |
| KR | 10-2013-0014442 A | 2/2013 |

* cited by examiner

*Primary Examiner* — Kambiz Zand
*Assistant Examiner* — Abiy Getachew
(74) *Attorney, Agent, or Firm* — LRK Patent Law Firm

(57) ABSTRACT

A wireless access point apparatus for configuring a multiple data security tunnel, and a system having the same and a method thereof, and more particularly, a technology associated with a wireless access point apparatus that supports a wireless secure throughout all layers in a wireless network section. The wireless access point apparatus for configuring a multiple data security tunnel includes: a control security tunnel managing unit managing a control security tunnel that transfers policies and authentication information for wireless network access control and management; and a multiple data security tunnel managing unit creating a data security tunnel for each of a plurality of wireless terminals, while, creating and managing the multiple data security tunnel for each of application services of the plurality of wireless terminals.

18 Claims, 3 Drawing Sheets

ACCESS POINT APPARATUS FOR CONFIGURING MULTIPLE SECURITY TUNNEL, AND SYSTEM HAVING THE SAME AND METHOD THEREOF

CROSS-REFERENCE TO RELATED APPLICATIONS

This application claims priority to and the benefit of Korean Patent Application No. 10-2014-0041005 filed in the Korean Intellectual Property Office on Apr. 7, 2014, the entire contents of which are incorporated herein by reference.

TECHNICAL FIELD

The present invention relates to a wireless access point apparatus for configuring a multiple data security tunnel, and a system having the same and a method thereof, and more particularly, to a technology associated with a wireless access point apparatus that supports wireless security throughout all layers in a wireless network section.

BACKGROUND ART

In recent years, due to convenience of wireless communications, the number of users using various wireless communications including mobile communications using a 3G network or an Internet network, local area wireless communications such as Zigbee and RFID, and the like has explosively increased. Further, more various services using the mobile communications have been provided.

However, the wireless communications have an advantage that the users can easily access as compared with wired communication, but the wireless communications are relatively vulnerable to hacking, and the like. For wireless section security, various technologies have been applied and developed, which include encryption of data at an MAC level, an access control through an SSID, information protection for the data encryption, and the like, such as AES128.

However, since the technologies operate based on a security key, when one security key is extorted, safety of information generated in all corresponding wireless sections cannot be guaranteed.

Accordingly, a wireless network security technology is required in all wireless network layers.

SUMMARY OF THE INVENTION

The present invention has been made in an effort to provide a wireless access point apparatus that creates a wireless multiple data security tunnel for each terminal and each application service in a wireless network section to provide wireless security to all layers in the wireless network sections.

An exemplary embodiment of the present invention provides a wireless access point apparatus for configuring a multiple data security tunnel includes: a control security tunnel managing unit managing a control security tunnel that transfers policies and authentication information for wireless network access control and management; and a multiple data security tunnel managing unit creating a data security tunnel for each of a plurality of wireless terminals, while, creating and managing the multiple data security tunnel for each of application services of the plurality of wireless terminals.

The control security tunnel managing unit may include a security policy managing unit storing and managing the policies for the wireless network access control and management, which are received through the control security tunnel; and an authentication caching unit storing the authentication information received through the control security tunnel and performing the authentication when receiving an authentication request for a wireless terminal that requests tunnel creation from the multiple data security tunnel managing unit.

The multiple data security tunnel managing unit may include a terminal and application identifying unit identifying the wireless terminal and an application service executed by the wireless terminal when receiving the request for the tunnel creation from the wireless terminal; and a multiple data security tunnel controlling unit controlling creation, maintenance, and termination of the multiple data security tunnel with the plurality of wireless terminals.

The multiple data security tunnel managing unit may further include an application tunnel multiplexing unit reclassifying and creating the multiple data security tunnel by the unit of the application service so as to connect the multiple data security tunnel created in a wireless network section to a wired network section.

The application tunnel multiplexing unit may be configured to decrease the number of the multiple data security tunnels in the wired network section by integrating the multiple data security tunnels by the unit of the application service in the wireless network section.

Another exemplary embodiment of the present invention provides a wireless access point system for configuring a multiple data security tunnel, including: a wireless terminal accessing a wireless network; an Internet server accessing a wired network; and a wireless access point apparatus creating and terminating the multiple data security tunnel for each wireless terminal and each application service in the wireless network, and creating and terminating the multiple data security tunnel for each Internet server and each application service.

The wireless access point apparatus may reclassify multiple data security tunnels with the wireless terminal by the unit of the application service to create multiple data security tunnels with the Internet server, wherein the number of the multiple data security tunnels with the Internet server is smaller than that of the multiple data security tunnels with the wireless terminal.

The system may further include: an authentication server transferring authentication information to the wireless access point apparatus through a control security tunnel; and a management server transferring policies for wireless network access control and management through the control security tunnel.

The wireless access point apparatus may include a control security tunnel managing unit managing a control security tunnel that transfers policies and authentication information for wireless network access control and management; and a multiple data security tunnel managing unit creating a data security tunnel for each wireless terminal, while, creating and managing the multiple data security tunnel for each of application services of the plurality of wireless terminals.

The multiple data security tunnel managing unit may include: a terminal and application identifying unit identifying the wireless terminal and an application service executed by the wireless terminal when receiving the request for the tunnel creation from the wireless terminal; and a multiple data security tunnel controlling unit controlling creation, maintenance, and termination of the multiple data security tunnel with the wireless terminal.

The multiple data security tunnel managing unit may further include an application tunnel multiplexing unit reclassifying and creating the multiple data security tunnel by the unit of the application service so as to connect the multiple data security tunnel created in the wireless network section to a wired network section.

The application tunnel multiplexing unit may be configured to decrease the number of the multiple data security tunnels in the wired network section by integrating the multiple data security tunnels by the unit of the application service in the wireless network section.

Still another exemplary embodiment of the present invention provides a method for configuring a multiple data security tunnel of a wireless access point apparatus, including: identifying a terminal and an application service when receiving a request for creating a wireless data tunnel from a wireless terminal; authenticating the identified terminal; and creating a wireless data security tunnel corresponding to the application service of the wireless terminal when the authentication is approved.

In the creating of the wireless data security tunnel, the wireless multiple data security tunnel may be created by multiplexing the wireless data security tunnel into the plurality of wireless data security tunnels for each application service of the wireless terminal.

The method may further include reclassifying the multiple wireless data security tunnels by the unit of the application service to create a wired multiple data security tunnel in a wired network section.

The authenticating may include determining whether authentication information of a wireless terminal requesting creation of the wireless data tunnel is stored in the wireless access point apparatus; outputting an authentication approval signal when the authentication information of the wireless terminal requesting the creation of the wireless data tunnel is stored in the wireless access point apparatus; and requesting authentication to an authentication server through a control security tunnel when the authentication information of the wireless terminal requesting the creation of the wireless data tunnel is not stored in the wireless access point apparatus.

The authentication information may include ID information of the wireless terminal and authentication key information.

In the identifying of the terminal and the application service, the terminal and the application service may be identified by using header information of a packet received from the wireless terminal.

According to exemplary embodiments of the present invention, a data security tunnel of a wired network section is extended to a wireless network section and a wireless access point apparatus that manages a security tunnel for each user and each application is provided to minimize damages by limiting a security risk degree to a specific user even though a key is extorted by various attacks.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

Objects of the present invention are not limited the aforementioned object and other objects and advantages of the present invention, which are not mentioned can be appreciated by the following description and will be more apparently know by the exemplary embodiments of the present invention. It can be easily known that the objects and advantages of the present invention can be implemented by the means and a combination thereof described in the appended claims.

Figure 1:
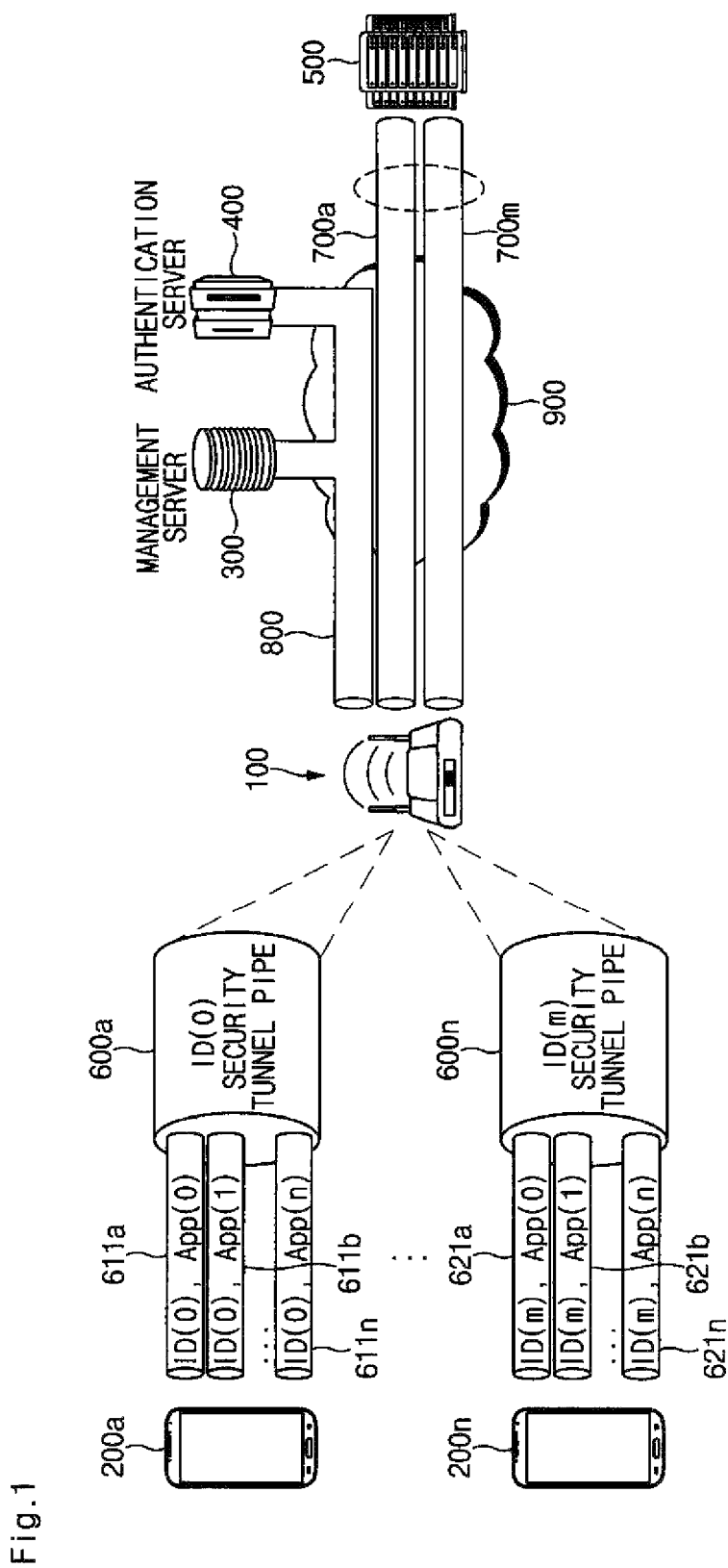
FIG. 1 is a configuration diagram of a wireless access system for configuring a wireless multiple data security tunnel according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, for detailed description so as for those skilled in the art to easily carry out the technical spirit of the present invention, exemplary embodiments of the present invention will be described with reference to the accompanying drawings.

The present invention is a technology that provides a wireless access point apparatus that extends a security tunnel of a wired network section to a wireless network section and manages a multiple data security tunnel for each terminal and each application service, and as a result, a security risk is limited to one tunnel, that is, one applications service or one terminal even though an authentication key is extorted by various attacks to strengthen the security of a wireless network.

Hereinafter, a wireless access point apparatus for configuring a multiple data security tunnel in a wireless network section, and a wireless access point system and a method thereof according to exemplary embodiments of the present invention will be described with reference to FIGS. 1 to 3.

FIG. 1 is a configuration diagram of a wireless access point system for configuring a wireless multiple data security tunnel according to an exemplary embodiment of the present invention.

The wireless access point system according to the present invention includes a wireless access point apparatus 100, wireless terminals 200a, . . . , 200n, a management server 300, an authentication server 400, and an Internet server 500.

In this case, the wireless access point apparatus 100 and the wireless terminals 200a, . . . , 200n are connected to wireless multiple data security tunnels 611a, 611b, . . . , 611n, 621a, 621b, . . . , 621n and wireless multiple data security tunnel bundles may be marked with security tunnel pipes 600a, . . . , 600n for each terminal for easy description. Further, the wireless access point apparatus 100 is connected with the management server 300, the authentication server 400, the Internet server 500, and the like. In this case, the wireless access point apparatus 100 is connected with the management server 300 and the authentication server 400 through a control security tunnel 800 to transmit and receive policy or authentication information. Further, the wireless access point apparatus 100 forms wired multiple data security tunnels 700a, . . . , 700m for each application service with the Internet server 500. In this case, the number of the wired multiple data security tunnels 700a, . . . , 700m for each application service in a wired network is implemented to be smaller than the number of wireless multiple data security tunnels 611a, 611b, . . . , 611n, 621a, 621b, . . . , 621n for each application service in the wireless network to minimize deterioration of network performance of the wired network.

The management server 300 manages policies for wireless network access control and wireless network control and the policies are transmitted to the wireless access point apparatus 100 through the control security tunnel 800.

The authentication server 400 stores authentication information for creating the data security tunnel, and when the authentication server 400 receives an authentication request from the wireless access point apparatus 100, the authentication server 400 performs authentication by using the authentication information and transmits a result of the authentication to the wireless access point apparatus 100. In this case, the authentication information may include a terminal ID for terminal access control, all network information required for access control and tunnel management, which includes authentication key information for tunnel creation, and the like.

The Internet server 500 is connected with the wireless access point apparatus 100 through the wired network and the data security tunnels 700a, . . . , 700m for each application service are formed between the wireless access point apparatus 100 and the Internet server 500.

As described above, in the present invention, even though problems such as extortion of an authentication key, and the like occur by forming the wireless multiple data security tunnels 611a, 611b, . . . , 611n, 621a, 621b, . . . , 621n for each terminal and each application service between the wireless access point apparatus 100 and the wireless terminals 200a, . . . , 200n, the problems are limited to a problem of security associated with the corresponding application service to strengthen security in the wireless network.

Figure 2:
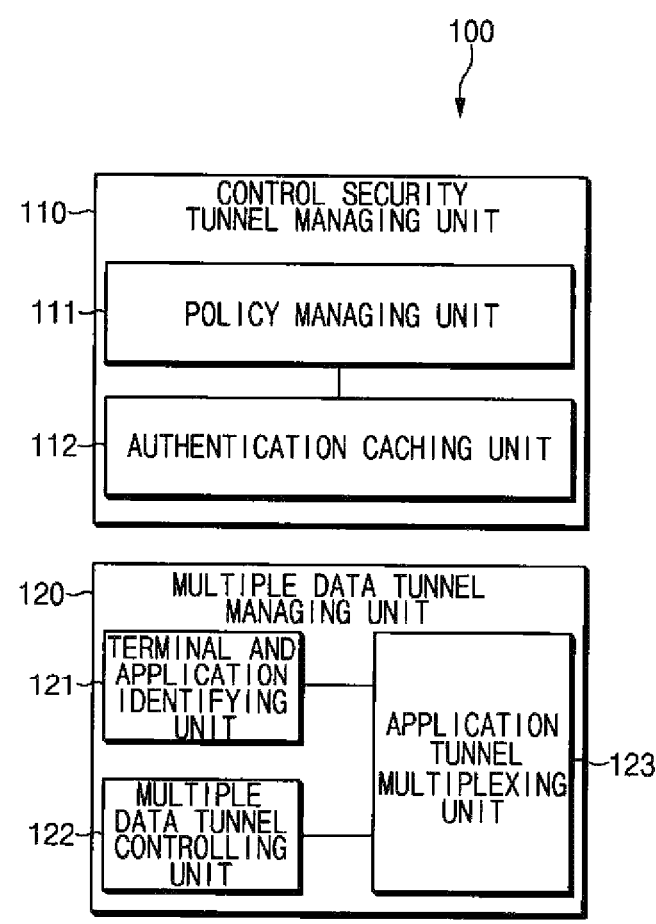
FIG. 2 is a detailed configuration diagram of a wireless access point apparatus according to the exemplary embodiment of the present invention.

FIG. 2 is a detailed configuration diagram of a wireless access point apparatus 100 according to the exemplary embodiment of the present invention.

The wireless access point apparatus according to the present invention includes a control security tunnel managing unit 110 and a multiple data security tunnel managing unit 120.

The control security tunnel managing unit 110 is used to manage the control security tunnel for transferring the access control, the authentication, and the policies and interworks with the management server 300 and the authentication server 400 through the control security tunnel 800. That is, the control security tunnel managing unit 100 receives policy information for the wireless network access control and the wireless network control from the management server 300, requests authentication of an unregistered terminal and receives the authentication result to and from the authentication server 400. In this case, since the policies for the wireless network access control and the wireless network control use a general wireless network wireless access technology, a detailed description of the policies will be omitted in the present invention.

To this end, the control security tunnel managing unit 110 includes a policy managing unit 111 and an authentication caching unit 112.

The policy managing unit 111 receives the policies for the wireless network access control and the wireless network control received from the management server 300 through the control security tunnel 800 and stores the received policies. The policies may include a policy regarding restriction of a bandwidth of a specific tunnel, a policy regarding a user access level (visitors, normal employees, board members, or a management, system managers, and the like), a policy regarding a resource use permission level (network access, system access, and the like), a policy regarding a data security level, a policy regarding permission of application services, and the like.

The authentication caching unit 112 stores the authentication information received from the authentication server 400 through the control security tunnel 800 in a list form and allows the wireless access point apparatus 100 to directly perform the authentication when receiving a request for tunnel creation in the same terminal. In this case, the authentication information may include a terminal ID for terminal access control, all network information required for access control and tunnel management, which includes authentication key information for tunnel creation, and the like.

Further, an authentication information list may be stored in a form of a white list which is an authentication permissible list or a black list storing an authentication rejection list, and this may be implemented differently depending on a service method.

Further, since there are many cases in which the user concentratively uses the same type of application service, there is a high possibility that authentication information of which the use is expired at present will be used again soon. That is, the authentication information has an attribute which is high in temporal or spatial locality. In the present invention, a memory structure storing the authentication information is configured in a cache form, and the authentication caching unit 112 stores a part of the authentication information and all authentication information of the authentication caching unit 112 should be stored in the authentication server 400, but all authentication information of the authentication server 400 need not be stored in the authentication caching unit 112. Accordingly, the authentication caching unit 112 and the authentication server 400 have a cache structure of a write-through form. When all of the authentication information is full in the authentication caching unit 112, authentication information not used during the longest period is deleted and new authentication information is stored. As a method for storing new authentication information, various methods may be used according to implementation of the authentication caching unit 112.

The multiple data security tunnel managing unit 120 manages connection, management, and termination of the multiple data security tunnel in the wireless network section and the wired network section. To this end, the multiple data security tunnel managing unit 120 includes a terminal and application identifying unit 121, a multiple data security tunnel controlling unit 122, and an application tunnel multiplexing unit 123.

The terminal and application identifying unit 121 identifies a terminal that requests for creating the security tunnel and the application service. In this case, the terminal and application identifying unit 121 identifies the terminal by using destination address information and departure point address information included in a header of a packet received from a wireless terminal and identifies the application service by using application service type information included in the header of the packet.

The multiple data security tunnel controlling unit 122 controls creating, maintaining, and terminating the wireless multiple data security tunnels 611a, 611b, ..., 611n, 621a, 621b, ..., 621n for each terminal and each application service identified by the terminal and application identifying unit 121.

The application tunnel multiplexing unit 123 reclassifies a data tunnel created by the unit of a terminal and application service in order to transmit a tunnel of the terminal and application service unit created in the wireless network section by the unit of the application service to create the wired multiple data tunnels 700a, ..., 700m. That is, when multiple tunnels subdivided in the wireless network section is applied even in the wired network, performance deterioration may occur due to a lot of tunnels. Therefore, the number of the multiple tunnels is minimized by integrating the multiple tunnels subdivided in the wireless network section for each application service in the wired network section to minimize deterioration of network performance. That is, since a normal service may be difficult due to a flood of the tunnels created form the terminal in the wired section, the tunnel is managed by the unit of the application service. As the method for managing the tunnel by the unit of the application service, a method for managing a security tunnel by bundling packets for the same application service by the unit of a flow through examination of the packet header is used. For example, a VoIP service used by terminal A and a VoIP service used by terminal B are individually created and managed in the wireless section, but the services are managed by one security tunnel called the VoIP service in the wired section. The wired/wireless section tunnel managing method may block a cyber attack by creation of a false tunnel, which occurs in the wireless section and present a wired network structure to flexibly cope with a rapid increase in the number of wireless terminals and the number of APs.

The present invention having such as a configuration forms the multiple data security tunnel for each terminal in the wireless network section, hierarchically creates and manages the wireless multiple data security tunnel for each application service of the terminal, and as a result, even though the authentication key is extorted by the cyber attack such as a man in middle attack in the wireless network section, a damage range is limited to one terminal or one application service to minimize damages by the cyber attack.

Figure 3:
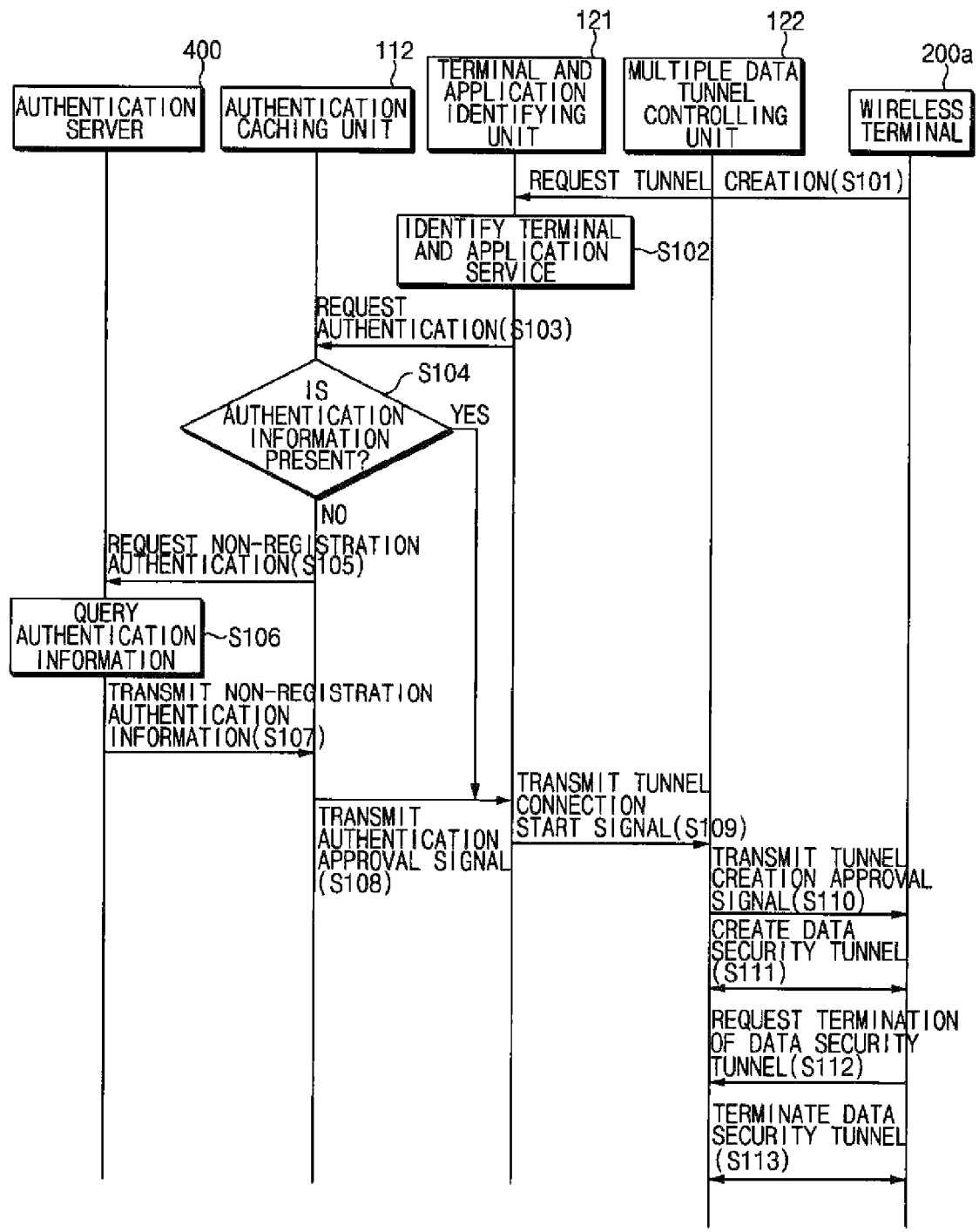
FIG. 3 is a flowchart illustrating a method for creating a wireless multiple data security tunnel of a wireless access point apparatus according to an exemplary embodiment of the present invention.

FIG. 3 is a flowchart illustrating a method for creating a wireless multiple data security tunnel of a wireless access point apparatus according to an exemplary embodiment of the present invention.

First, when the terminal and application identifying unit 121 is requested to create the tunnel creation from the wireless terminal 200a, the terminal and application identifying unit 121 identifies the terminal and the application service that requests the tunnel creation (S102). In this case, the terminal and application identifying unit 121 identifies the terminal and the application service by using the header information included in the packet received from the wireless terminal 200a. For example, the terminal and application identifying unit 121 identifies the terminal by using the destination address or departure point address information of the wireless terminal 200a and identifies whether the application service is VoIP, HTTP, or the like.

Thereafter, the terminal and application identifying unit 121 requests the authentication while transmitting the terminal and application service information regarding the terminal identified by the authentication caching unit 112 (S103).

Therefore, the authentication caching unit 112 queries whether the authentication information of the corresponding wireless terminal is stored in a cache therein (S104) and transmits an authentication approval signal for approving the tunnel creation to the terminal and application identifying unit 121 when the authentication information is stored.

In such step S104, when the authentication information of the corresponding wireless terminal 200a is not stored it is determined that the corresponding wireless terminal 200a is the unregistered terminal and the authentication is requested while transmitting the terminal information and the application service information regarding the corresponding wireless terminal 200a to the authentication server 400 through the control security tunnel 800 (S105).

Therefore, the authentication server 400 queries the authentication information of the corresponding wireless terminal 200a (S106) and transmits the authentication information of the corresponding wireless terminal to the authentication caching unit 112 through the control security tunnel 800 (S107).

Subsequently, the authentication caching unit 112 stores the authentication information (terminal ID information, the authentication key, and the like) of the corresponding wireless terminal 200a, which is received from the authentication server 400 and transmits the authentication approval signal to the terminal and application identifying unit 121 together with the authentication information (S108).

Thereafter, the terminal and application identifying unit 121 transmits a tunnel connection start signal for the application service of the corresponding wireless terminal 200a to the multiple data tunnel controlling unit 122 together with the authentication information (S109).

Therefore, the multiple data tunnel controlling unit 122 transmits the tunnel creation approval signal to the wireless terminal 200a together with the authentication information (S110).

Subsequently, the wireless data security tunnel is created between the multiple data tunnel controlling unit 122 and the wireless terminal 200a (S111). Thereafter, data is transmitted and received through the wireless data security tunnel.

Thereafter, when the multiple data tunnel controlling unit 122 is requested to terminate the wireless data security tunnel from the wireless terminal 200a (S112), the multiple data tunnel controlling unit 122 terminates the wireless data security tunnel connected with the wireless terminal 200a (S113). In the present invention, such steps S101 to S113 are repeatedly performed for each terminal and each application service, and as a result, the wireless data security tunnel is multiplexedly created and terminated.

As described above, by forming the multiple data security tunnel for each terminal and each application service in all layers of the wireless network section as well as the wired network section, although the attack such as the extortion of the authentication key, or the like is made, damages by the attack are limited to the data security tunnel for one terminal or one application service to strength the security of the wireless network.

Further, in the wired network section which is stronger in security than the wireless network section, the number of the multiple data security tunnels is decreased by reclassifying and integrating the multiple data security tunnels for each terminal and for each application service to enhance the performance of the wired network.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

What is claimed is:

1. A wireless access point apparatus for configuring a multiple data security tunnel, the apparatus comprising:
   one or more units executed by a processor and the processor causes to perform the one or more units using algorithm, the one or more units comprising,
   a control security tunnel managing unit managing a control security tunnel that transfers policies and, authentication information for controlling wireless network access control and management; and
   in response to detection of requests for creating tunnels from a plurality of wireless terminals, a multiple data security tunnel managing unit creating a plurality of wireless data security tunnels in a wireless network for responding the requests transmitted from one of the plurality of wireless terminals, each of the plurality of wireless data security tunnels being separately created for providing each of application services corresponding to the request of the one of the plurality of wireless terminals,
   wherein a plurality of data security tunnels are created in a wired network by extending to the wireless network to manage the plurality of data security tunnels in the wireless network, the plurality of data security tunnels are created between the Internet server and the wireless access point apparatus.

2. The apparatus of claim 1, wherein the control security tunnel managing unit includes:
   a security policy managing unit storing and managing the policies for the wireless network access control and management, which are received through the control security tunnel; and
   an authentication caching unit storing the authentication information received through the control security tunnel and performing the authentication in response to detection of a receipt of an authentication request for a wireless terminal that requests tunnel creation from the multiple data security tunnel managing unit.

3. The apparatus of claim 1, wherein the multiple data security tunnel managing unit includes:
   a terminal and application identifying unit identifying the wireless terminal and an application service executed by the wireless terminal in response to detection of a receipt of the request for the tunnel creation from the wireless terminal; and
   a multiple data security tunnel controlling unit controlling creation, maintenance, and termination of the multiple data security tunnel with the plurality of wireless terminals.

4. The apparatus of claim 3, wherein the multiple data security tunnel managing unit further includes an application tunnel multiplexing unit reclassifying and creating the multiple data security tunnel by the unit of the application service so as to connect the plurality of data security tunnels created in a wireless network section to a wired network section.

5. The apparatus of claim 4, wherein the application tunnel multiplexing unit is configured to decrease the number of the multiple data security tunnels in the wired network section by integrating the multiple data security tunnels by the unit of the application service in the wireless network section.

6. A system for configuring a multiple data security tunnel, the system comprising:
   a wireless access point apparatus;
   at least one or more wireless terminals connected to a plurality of wireless data security tunnels via a wireless network, each of the wireless terminals being connected to respective one of the plurality of wireless data security tunnels according to each of application services;
   one or more servers comprising an Internet server being connected to the wireless access point apparatus via a wired network; and
   in response to detection of a request, transmitted from the at least one or more wireless terminals,
   at least one or more of the plurality of wireless data security tunnels are created and terminated for providing and disconnecting a service for corresponding to the request of each of the wireless terminals associated with the each application service in the wireless network, and
   at least one or more of data security tunnels are created and terminated for providing and disconnecting an application service between the Internet server and the wireless access point apparatus in a wired network by extending to the wireless network to manage the plurality of data security tunnels in the wireless network.

7. The system of claim 6, wherein:
   the wireless access point apparatus reclassifies multiple data security tunnels with the at least one, or more wireless terminals by the unit of the application service to create multiple data security tunnels with the Internet server, wherein
   the number of the multiple data security tunnels with the Internet server is smaller than that of the multiple data security tunnels with the wireless terminal.

8. The system of claim 6, further comprising:
   an authentication server transferring, authentication information to the wireless access point apparatus through a control security tunnel; and
   a management server transferring policies for wireless network access control and management through the control security tunnel.

9. The system of claim 6, wherein the wireless access point apparatus includes:
   a control security tunnel managing unit managing a control security tunnel that transfers policies and authentication information for wireless network access control and management; and
   a multiple data security tunnel managing unit creating a data security tunnel for each wireless terminal, while creating and managing the multiple data security tunnel for each of application services of the at least one or more wireless terminals.

10. The system of claim 9, wherein the multiple data security tunnel managing unit includes:
- a terminal and application identifying unit identifying the at least one or more wireless terminals and an application service executed by the at least one or more wireless terminals in response to detection of the request for the tunnel creation from the at least one or more wireless terminals; and
- a multiple data security tunnel controlling unit controlling creation, maintenance, and termination of the multiple data security tunnel with the at least one or more wireless terminals.

11. The system of claim 10, wherein the multiple data security tunnel managing unit further includes an application tunnel multiplexing unit reclassifying and creating the multiple data security tunnel by the unit of the application service so as to connect the multiple data security tunnel created in a wireless network section to a wired network section.

12. The system of claim 11, wherein the application tunnel multiplexing unit is configured to decrease a number of the multiple data security tunnels in the wired network section by integrating the multiple data security tunnels by the unit of the application service in the wireless network section.

13. A computer-implemented method for configuring a multiple data security tunnel of a wireless access point apparatus, the method comprising:
- identifying a wireless terminal and an application service in response to receipt of a request for creating a wireless data tunnel, the request transmitted from the wireless terminal;
- authenticating the identified terminal;
- creating, by a processor, at least one or more wireless data security tunnels for responding the request transmitted from one of a plurality of wireless terminals, each of the at least one or more wireless data security tunnels being created corresponding to each application service of the wireless terminal corresponding to the request in response to receipt of an approval of the authentication; and
- creating a plurality of data security tunnels in a wired network by extending to the wireless network to manage the plurality of data security tunnels in the wireless network, the plurality of data security tunnels being created between an Internet server and the wireless access point apparatus.

14. The method of claim 13, wherein in the creating of the wireless data security tunnel, the at least one or more wireless multiple data security tunnels are created by multiplexing a wireless data security tunnel into a plurality of wireless data security tunnels for each application service of the wireless terminal corresponding to the request.

15. The method of claim 14, further comprising:
- reclassifying the at least one or more wireless data security tunnels by the unit of the application service to create the plurality of data security tunnels in a wired network section.

16. The method of claim 13, wherein the authenticating includes:
- determining whether authentication information of a wireless terminal requesting creation of the wireless data tunnel is stored in the wireless access point apparatus;
- outputting an authentication approval signal when the authentication information of the wireless terminal requesting the creation of a wireless data tunnel is stored in the wireless access point apparatus; and
- requesting authentication to an authentication server through a control security tunnel when the authentication information of the wireless terminal requesting the creation of the wireless data tunnel is not stored in the wireless access point apparatus.

17. The method of claim 16, wherein the authentication information includes an identification (ID) information of the wireless terminal and authentication key information.

18. The method of claim 13, wherein in the identifying of the terminal and the application service, the wireless terminal and the application service are identified by using header information of a packet received from the wireless terminal.

* * * * *